US012394939B2

(12) United States Patent
Wu

(10) Patent No.: US 12,394,939 B2
(45) Date of Patent: Aug. 19, 2025

(54) CONNECTOR STRUCTURE FOR SECURE INSTALLATION

(71) Applicants: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Jiangsu (CN); LI YANG ELECTRIC MACHINERY (DONGGUAN) CO., LTD., Dong Guan (CN)

( * ) Notice: Subject to any disclaimer, the term of this patent is extended or adjusted under 35 U.S.C. 154(b) by 386 days.

(21) Appl. No.: 18/089,275

(22) Filed: Dec. 27, 2022

(65) Prior Publication Data

US 2024/0213716 A1 Jun. 27, 2024

(51) Int. Cl.
*H01R 13/629* (2006.01)
*H01R 13/514* (2006.01)
*H01R 13/627* (2006.01)

(52) U.S. Cl.
CPC ..... *H01R 13/62966* (2013.01); *H01R 13/514* (2013.01); *H01R 13/627* (2013.01); *H01R 13/62944* (2013.01)

(58) Field of Classification Search
CPC ............ H01R 13/62966; H01R 13/514; H01R 13/627; H01R 13/62944; H01R 13/743
USPC .......................................................... 439/372
See application file for complete search history.

(56) References Cited

U.S. PATENT DOCUMENTS

2012/0071023 A1* 3/2012 Kuhlmann ........... H01R 13/745
439/533

FOREIGN PATENT DOCUMENTS

DE 10315661 A1 11/2004
DE 102019104574 A1 * 11/2019
EP 1655813 A1 5/2006

OTHER PUBLICATIONS

Office Action dated Oct. 5, 2023 of the corresponding German patent application No. 102023101504.4.

* cited by examiner

*Primary Examiner* — Tulsidas C Patel
*Assistant Examiner* — Jeffrey Mountain
(74) *Attorney, Agent, or Firm* — Chun-Ming Shih; HDLS IPR SERVICES

(57) ABSTRACT

The present disclosure provides a connector structure (10) for secure installation, which is installed on a fixed plate (100) having a through hole (101). The connector structure (10) includes a connector housing (1), two elastic clamping arms (2), and two operable levers (3). The connector housing (1) is inserted through the through hole (101). The two elastic clamping arms (2) are extended from the connector housing (1) and arranged on two opposite sides of the connector housing (1). The two operable levers (3) are pivotally connected to the connector housing (1) and sandwiched between the connector housing (1) and the two elastic clamping arms (2). The two operable levers (3) include two inclined surfaces (31), which gradually increase in thickness (h), in a direction away from the through hole (101).

11 Claims, 9 Drawing Sheets

CONNECTOR STRUCTURE FOR SECURE INSTALLATION

TECHNICAL FIELD

The present disclosure relates to a connector installation structure, and in particular, to a connector structure for secure installation.

DESCRIPTION OF RELATED ART

Connectors such as terminal blocks are used in electronic devices to fix a terminal structure. Terminals are connected to each other or connected to cables, thereby achieving signal transmission or power transmission between different electronic components.

However, related-art connectors are usually mounted on electronic devices by means of screws. During transportation of the electronic device, vibrations of vehicles may easily loosen the screws, which leads to detachment of the connector from the electronic device. Therefore, how to securely mount the connector on the electronic device is an important research topic in the industry.

In light of the above, the inventor of the present disclosure has devoted himself to doing research and studying scientific principles so as to solve the above problem of related-art techniques.

SUMMARY OF THE DISCLOSURE

The present disclosure provides a connector structure for secure installation. An inclined surface of an operable lever is used to push an elastic clamping arm outward to make the elastic clamping arm be engaged with a fixed plate, so that the connector structure may be securely mounted on the fixed plate.

In one embodiment, the present disclosure provides a connector structure for secure installation, installed on a fixed plate. The fixed plate is provided with a through hole. The connector structure includes: a connector housing inserted through the through hole; two elastic clamping arms extended from the connector housing and arranged on two opposite sides of the connector housing; and two operable levers, each of the two operable levers pivotally connected to the connector housing and sandwiched between the connector housing and a corresponding one of the two elastic clamping arms. The two operable levers include two inclined surfaces such that each of the two operable levers has a bulged portion gradually increase in thickness in a direction away from the through hole and are disposed corresponding to the two elastic clamping arms. When the two operable levers rotate toward the through hole, the two elastic clamping arms are pushed outward by the two inclined surfaces to be engaged with the fixed plate.

Accordingly, when the two operable levers rotate toward the through hole, the two elastic clamping arms are pushed outward by the two inclined surfaces to be engaged with the fixed plate. Therefore, when the connector housing is pushed into the through hole, the two engagement blocks and the fixed plate block each other, thereby preventing the connector housing from retracting into the through hole when the connector housing is pushed. As a result, the connector structure is securely mounted on the fixed plate.

In light of the above, the connector housing includes two U-shaped elastic arms. Each of the U-shaped elastic arms is provided with two pivot holes on inner sides opposite to each other. A pivot shaft protrudes from each of the operable levers and is pivotally connected to the two pivot holes correspondingly. Two ends of the U-shaped elastic arm are flexible, and thus the pivot shaft may be tightly and pivotally connected on the U-shaped elastic arm, and the pivot shaft is not prone to breakage when the operable lever rotates at any angle.

DETAILED DESCRIPTION

Figure 1:
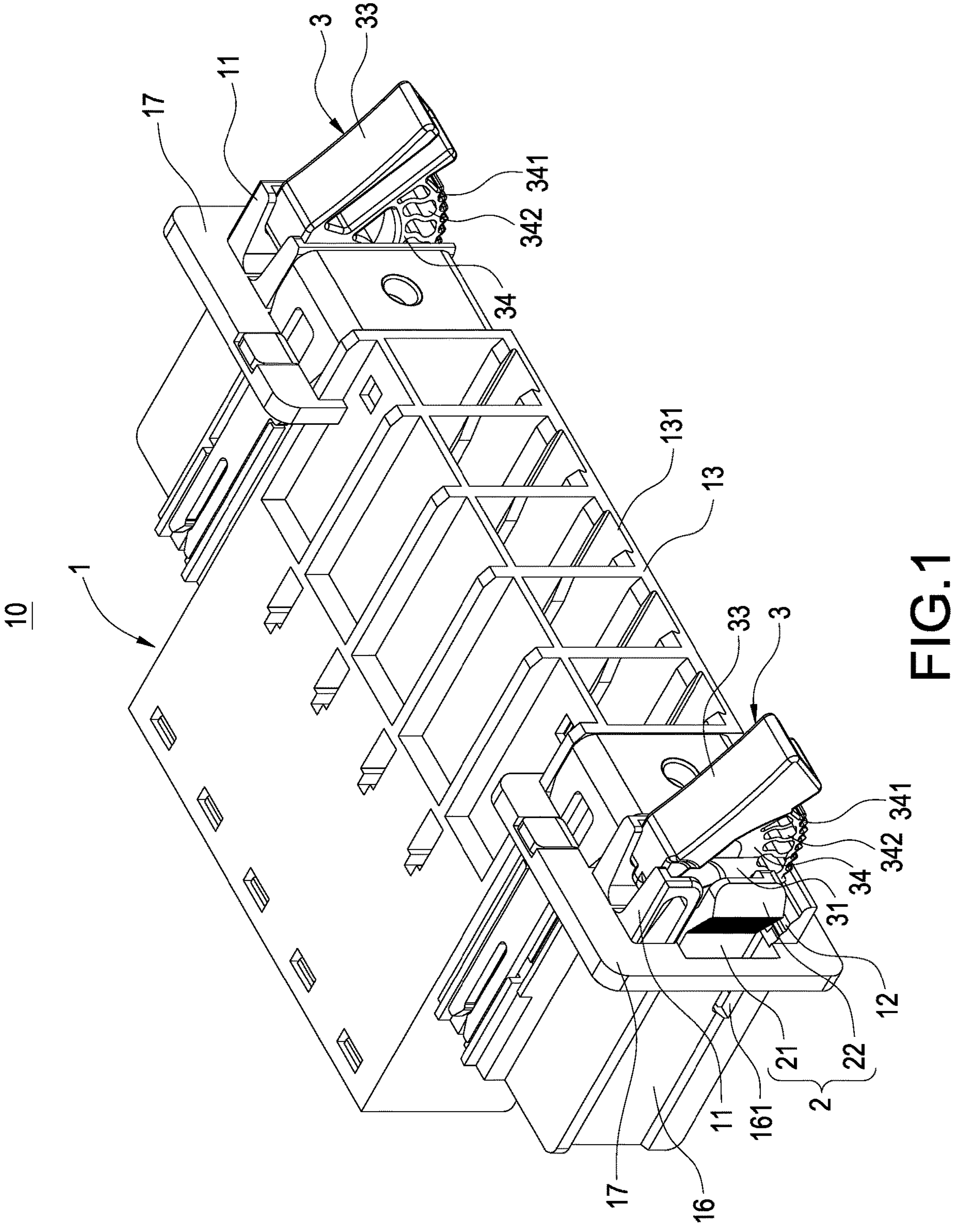
FIG. 1 is a perspective assembled view of a connector structure of the present disclosure.
Figure 2:
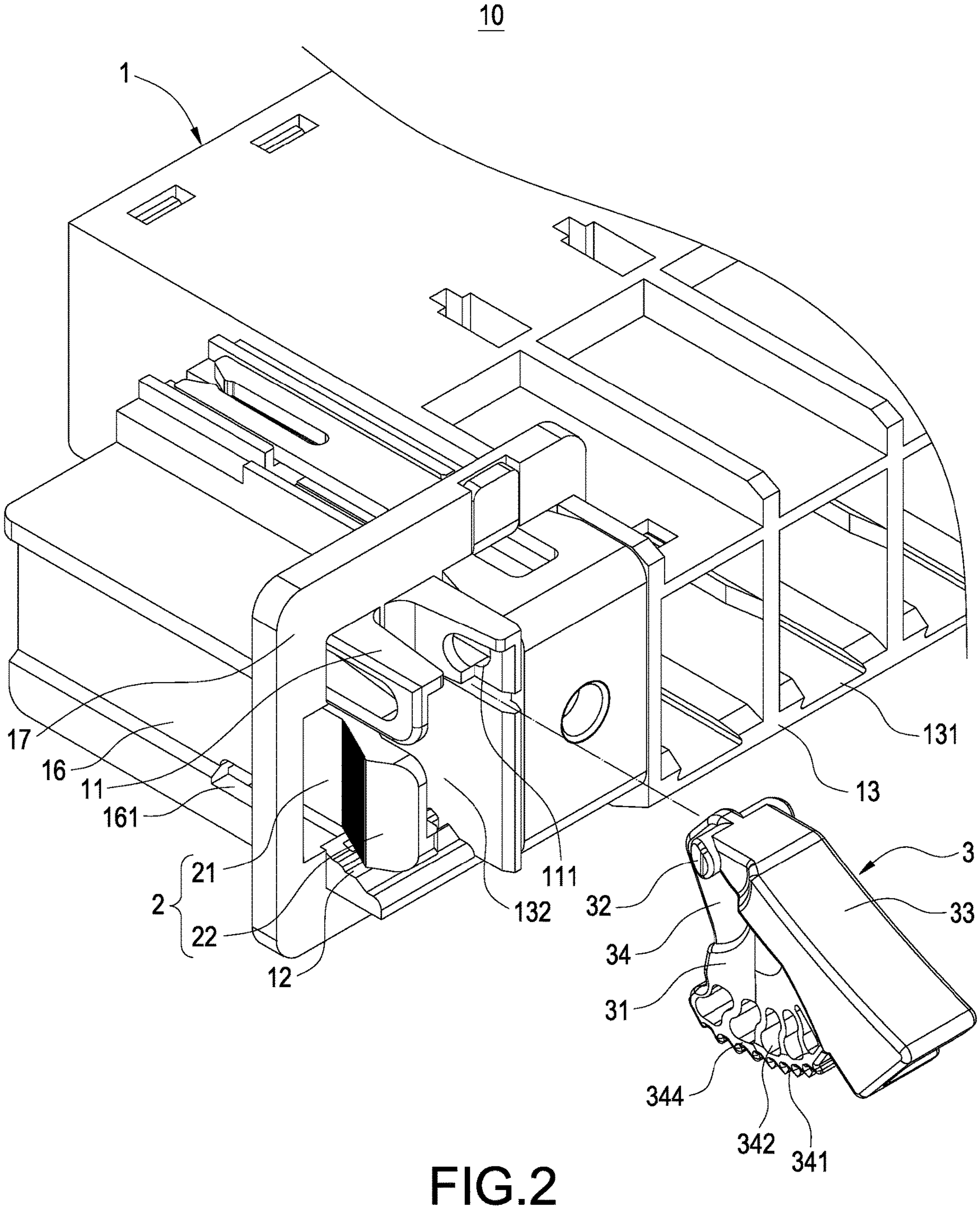
FIG. 2 is a perspective exploded view of the connector structure of the present disclosure.
Figure 3:
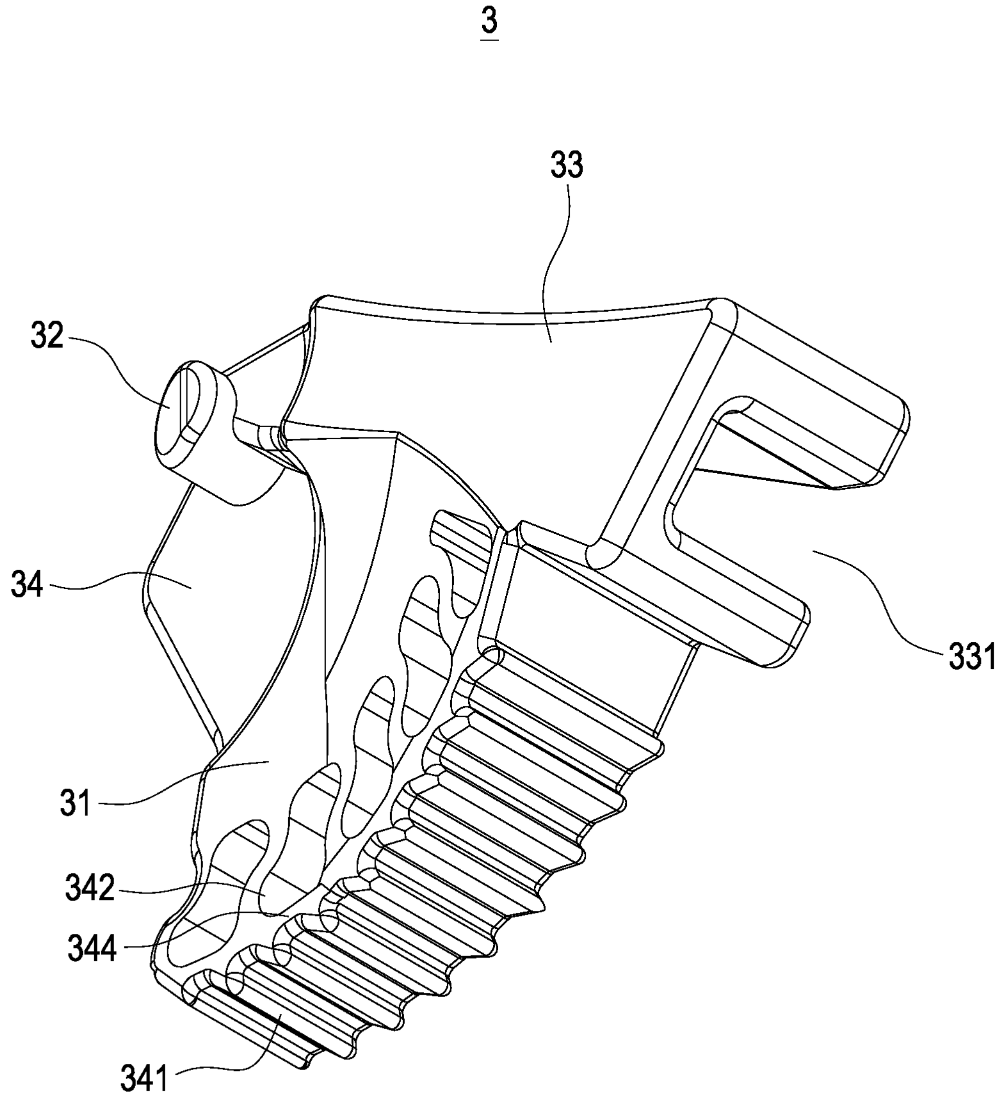
FIG. 3 is a schematic perspective view of an operable lever of the present disclosure.
Figure 4:
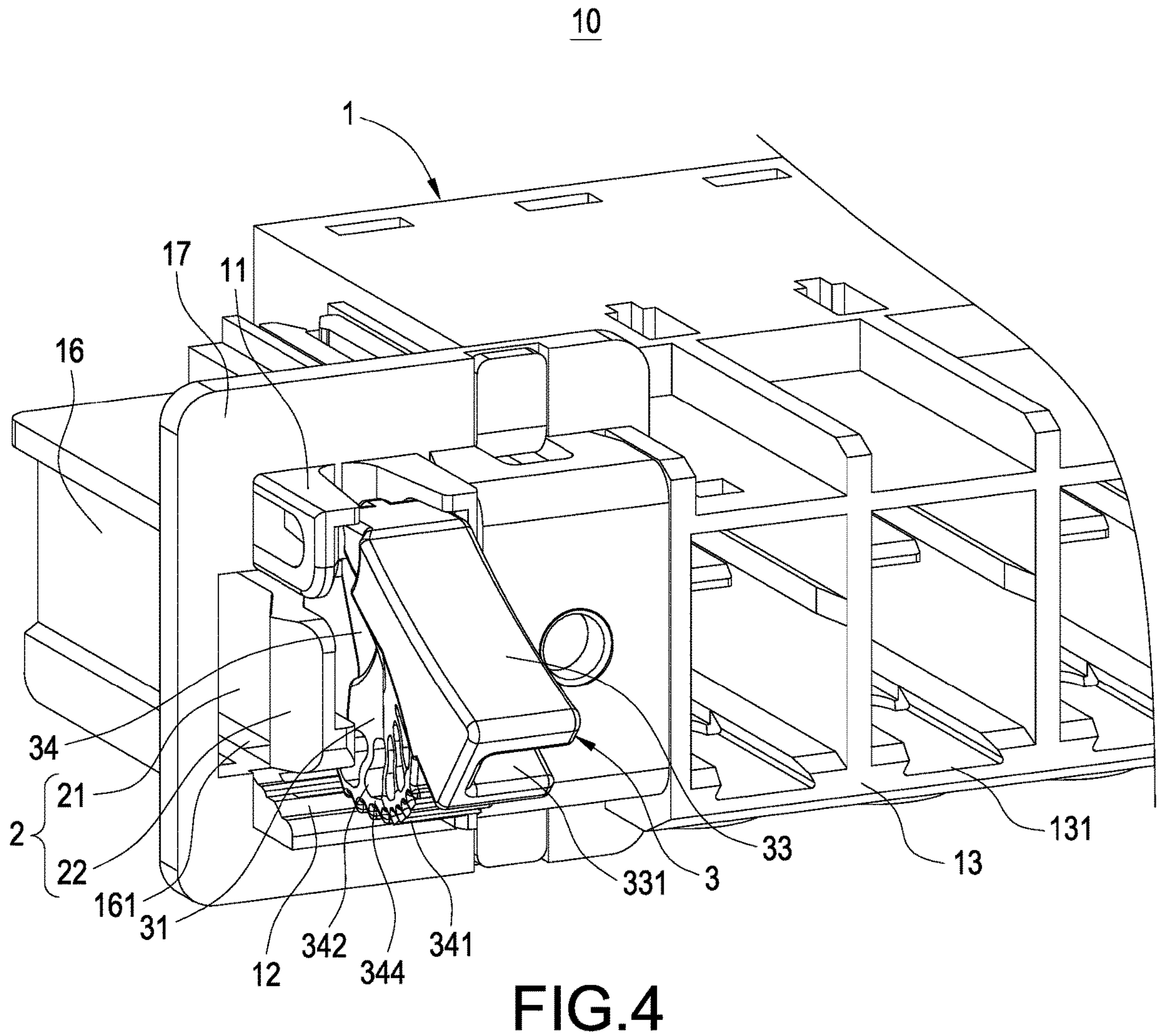
FIG. 4 is a schematic view of the connector structure in a first in-use state according to the present disclosure.
Figure 5:
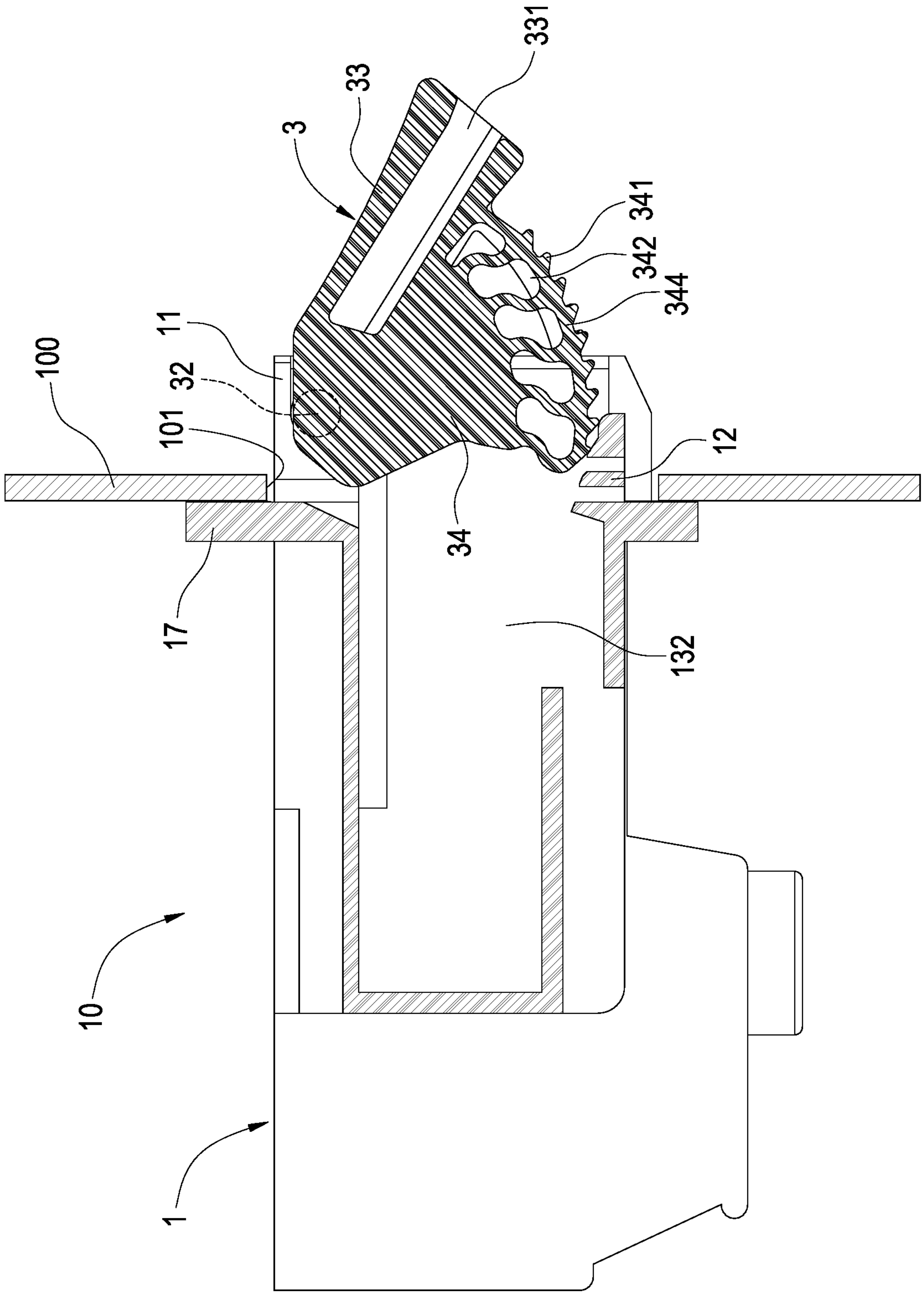
FIG. 5 is a schematic view of the connector structure in a second in-use state according to the present disclosure.
Figure 6:
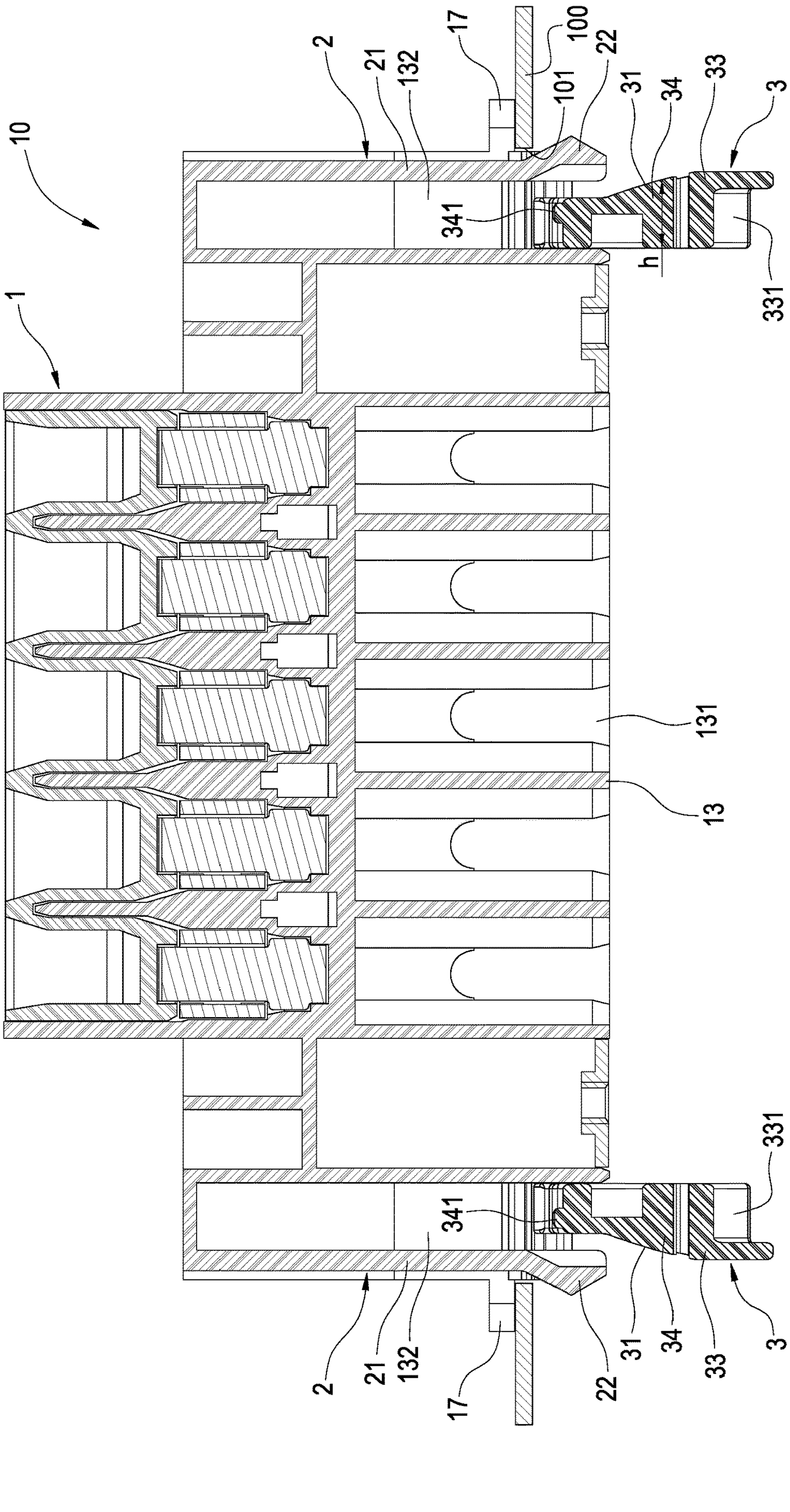
FIG. 6 is a schematic view of the connector structure in a third in-use state according to the present disclosure.
Figure 7:
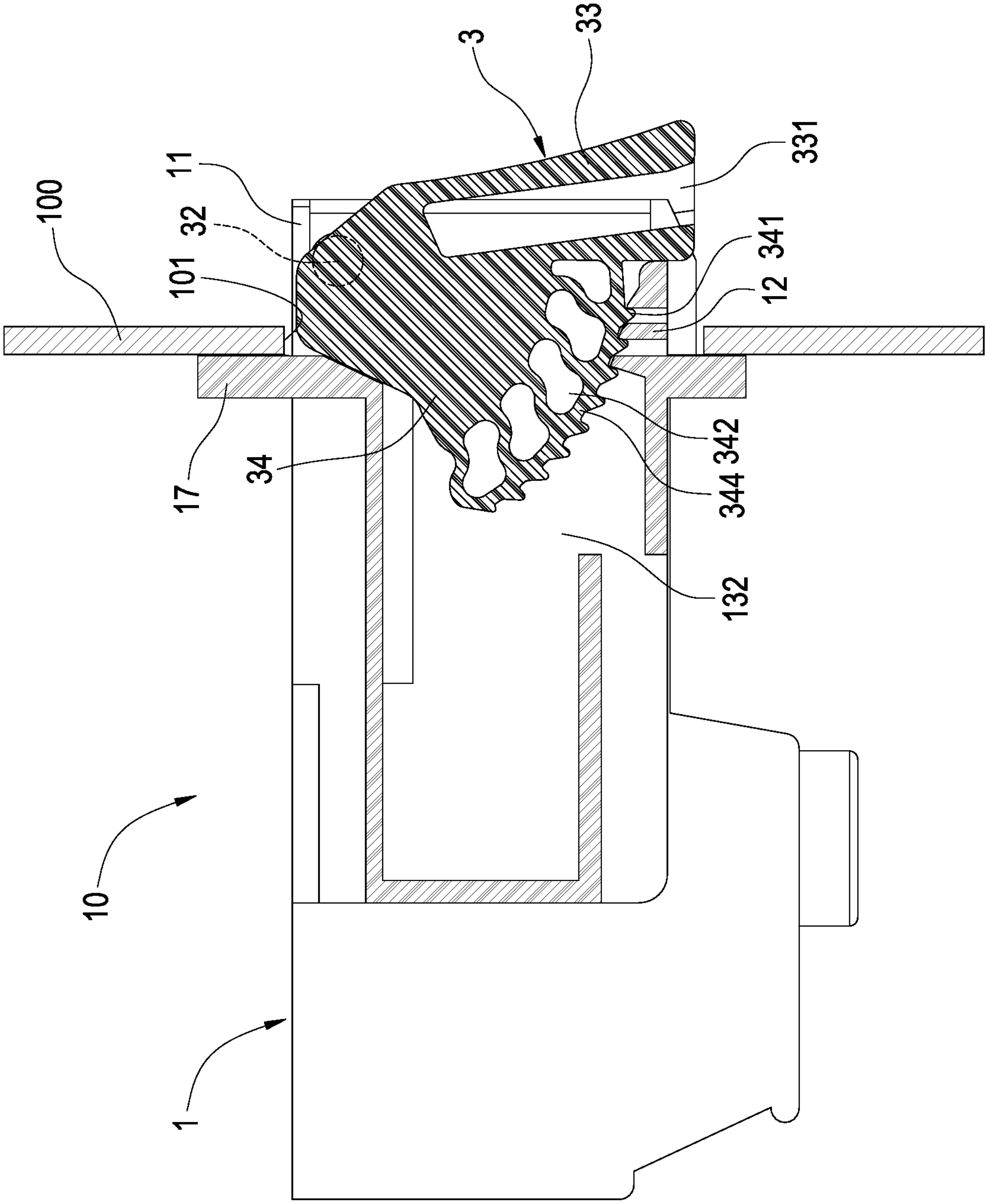
FIG. 7 is a schematic view of the connector structure in a fourth in-use state according to the present disclosure.
Figure 8:
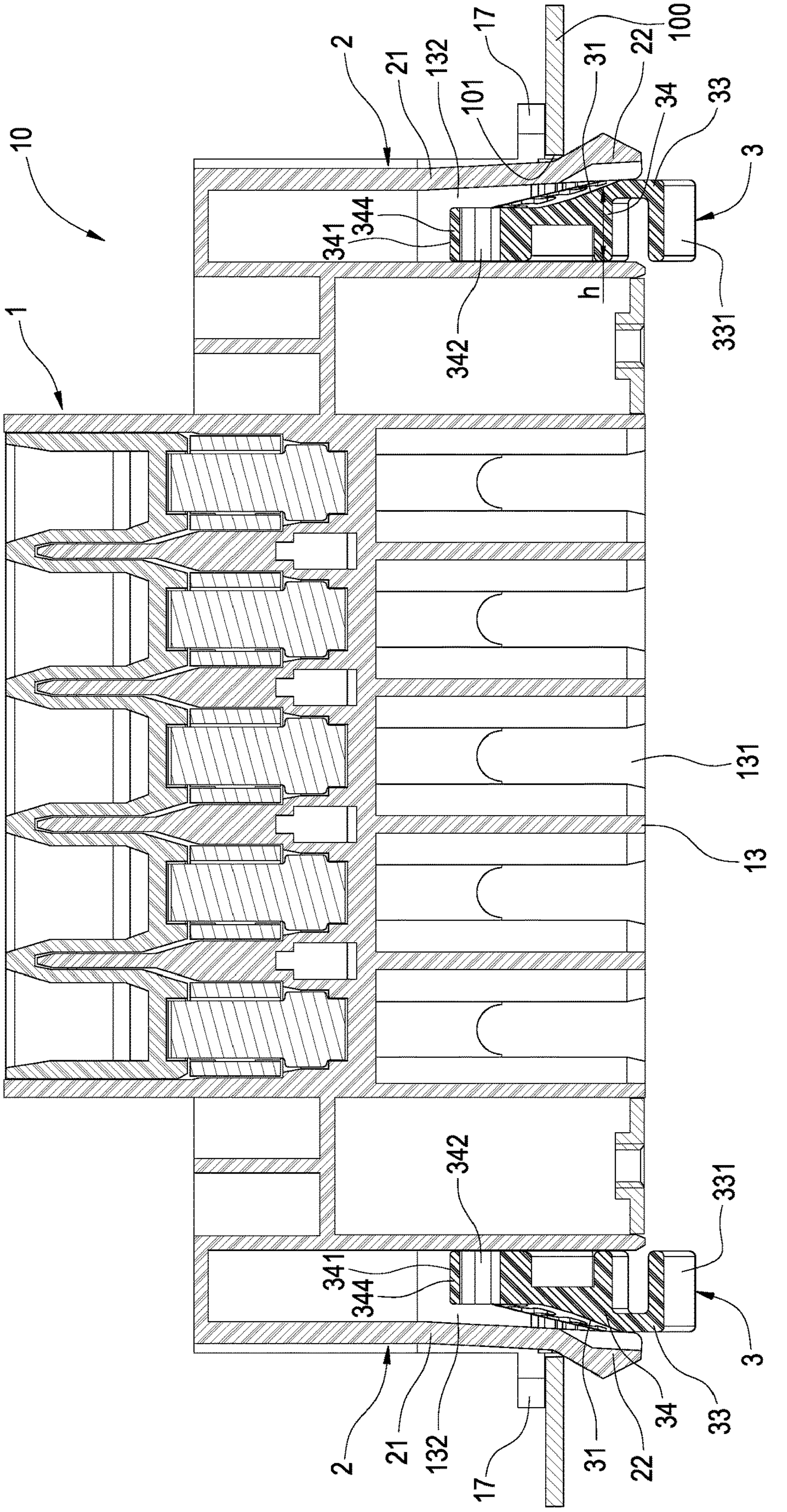
FIG. 8 is a schematic view of the connector structure in a fifth in-use state according to the present disclosure.

A detailed description and technical content of the present disclosure are provided below with reference to accompanying drawings. However, the accompanying drawings are only for illustrative purposes and are not intended to limit the present disclosure.

Please refer to FIGS. 1 to 8. The present disclosure provides a connector structure for secure installation. The connector structure is mounted on a fixed plate 100. The fixed plate 100 may be a casing or a wall of an electronic device. The fixed plate 100 is provided with a through hole 101. The connector structure 10 mainly includes a connector housing 1, two elastic clamping arms 2, and two operable levers 3.

As shown in FIGS. 1 to 2 and FIGS. 4 to 8, the connector housing 1 is made of an insulating material such as plastic or rubber. A part of the connector housing 1 is inserted through the through hole 101. The connector housing 1 includes a front side 13 exposed from the through hole 101. The connector housing 1 includes a plurality of insertion slots 131 defined in the middle of the front side 13 and two recesses 132 defined on left side and right side from the front side 13.

In addition, a part of the connector housing 1 is inserted through the through hole 101 from the rear of the fixed plate 100. Two stop blocks 17 are extended from the connector housing 1 and surround the two recesses 132 respectively. Each stop block 17 and the fixed plate 100 block each other to be positioned, so that when the connector housing 1 is pulled toward the front of the fixed plate 100, the two stop blocks 17 and the fixed plate 100 block each other to prevent the connector housing 1 from being moved out of the through hole 101 from the front of the fixed plate 100.

As shown in FIGS. 1 to 2 and FIGS. 4, 6, and 8, two elastic clamping arms 2 are extended from the connector housing 1 and arranged on two opposite sides of the connector housing 1.

In addition, the connector housing 1 includes two U-shaped elastic arms 11 and two toothed blocks 12. The two U-shaped elastic arms 11 are arranged between the connector housing 1 and one of the two elastic clamping arms 2 respectively, and are arranged above the two elastic clamping arms 2. The two toothed blocks 12 are arranged between the connector housing 1 and one of the two elastic clamping arms 2 respectively, and are arranged under the two elastic clamping arms 2. The two U-shaped elastic arms 11 and the two toothed blocks 12 are exposed from the through hole 101. Each of the U-shaped elastic arms 11 is provided with two pivot holes 111 on inner sides thereof and the two pivot holes 111 are opposite to each other.

Furthermore, each of the U-shaped elastic arms 11 is extended from an upper portion of a corresponding one of the stop blocks 17 in a direction away from a corresponding one of the recesses 132. Each toothed block 12 is extended from a lower portion of a corresponding one of the stop blocks 17 in a direction away from a corresponding one of the recesses 132. Therefore, each U-shaped elastic arm 11 and each toothed block 12 are respectively disposed on an upper side and a lower side with respect to a front end of the corresponding recess 132.

Moreover, the connector housing 1 includes an outer side wall 16 formed on an outer side of each of the recesses 132. Each of the outer side walls 16 has two linear grooves 161 extended inward from an open end of a corresponding one of the recesses 132. Each elastic clamping arm 2 includes a linear elastic arm 21 located on the corresponding outer side wall 16 and arranged between the corresponding two linear grooves 161. Each elastic clamping arm 2 includes an engagement block 22 protruding from an outer side of the corresponding linear elastic arm 21. Each linear elastic arm 21 is flexible and may be bent relative to the corresponding two linear grooves 161.

As shown in FIGS. 1 to 8, each of the two operable levers 3 is pivotally connected to the connector housing 1 and sandwiched between the connector housing 1 and one of the two elastic clamping arms 2. The two operable levers 3 include two inclined surfaces 31 such that each operable lever 3 has bulged portion gradually increases in thickness h in a direction away from the through hole 101. The two inclined surfaces are disposed corresponding to the two elastic clamping arms 2.

A detailed description is provided below. A pivot shaft 32 protrudes from each of the operable levers 3. Two ends of each pivot shaft 32 are pivotally connected to the two pivot holes 111 respectively, so that each operable lever 3 may be received in or released from a corresponding one of the recesses 132. Each operable lever 3 includes a push block 33 and a fan-shaped block 34 arranged below the push block 33. Each inclined surface 31 is formed on an outer surface of a corresponding one of the fan-shaped blocks 34. Each push block 33 is provided with a socket 331 away from a corresponding one of the pivot shafts 32.

Furthermore, a lower edge of each of the fan-shaped block 34 is provided with a plurality of protruding teeth 341 engaged with a corresponding one of the toothed blocks 12. A plurality of hollow holes 342 are defined in the outer surface of each of the fan-shaped blocks 34 and adjacent to the corresponding lower edge, so that the lower edge of each of the fan-shaped blocks 34 forms a flexible edge strip 344.

Please refer to FIGS. 4 to 8, showing an in-use state of the connector structure 10 of the present disclosure. When the two operable levers 3 rotate toward the through hole 101, the two elastic clamping arms 2 are pushed outward by the two inclined surfaces 31 and are engaged with the fixed plate 100. Therefore, when the connector housing 1 is pushed into the through hole 101, the two engagement blocks 22 and the fixed plate 100 block each other, thereby preventing the connector housing 1 from retracting into the through hole 101 when the connector housing 1 is pushed. Furthermore, the two stop blocks 17 and the fixed plate 100 block each other to prevent the connector housing 1 from coming out of the through hole 101 from the front of the fixed plate 100, so that the connector structure 10 is securely mounted on the fixed plate 100.

In addition, the connector housing 1 includes two U-shaped elastic arms 11. Each of the U-shaped elastic arms 11 is provided with the two pivot holes 111 on the inner sides opposite to each other. Each pivot shaft 32 protrudes from one of the operable levers 3 and is pivotally connected to the two pivot holes 111. Two ends of the U-shaped elastic arm 11 are flexible, and thus the pivot shaft 32 may be tightly and pivotally connected on the U-shaped elastic arm 11, and the pivot shaft 32 is not prone to breakage when the operable lever 3 rotates at any angle.

Furthermore, the connector housing 1 includes the two toothed blocks 12, and each operable lever 3 is provided with the protruding teeth 341 engaged with a corresponding one of the toothed blocks 12. As a result, when the operable lever 3 rotate toward the through hole 101, each of the flexible edge strips 344 is slightly deformed under force by means of the hollow holes 342, so that the protruding teeth 341 are engaged with each toothed block 12 and rotate relative to each toothed block 12. The engagement between each toothed block 12 and the protruding teeth 341 may provide an engagement feel and enable the operable lever 3 to be positioned through the engagement between the toothed block 12 and the protruding teeth 341.

Moreover, each operable lever 3 includes the push block 33. When a user presses the push block 33, the operable lever 3 is pushed to rotate toward the through hole 101.

In addition, each push block 33 is provided with the socket 331 away from a corresponding one of the pivot shafts 32. The user may insert a screwdriver into the socket 331 to press down or pull up the operable lever 3, so that the operable lever 3 may rotate to move toward or away from the through hole 101.

Figure 9:
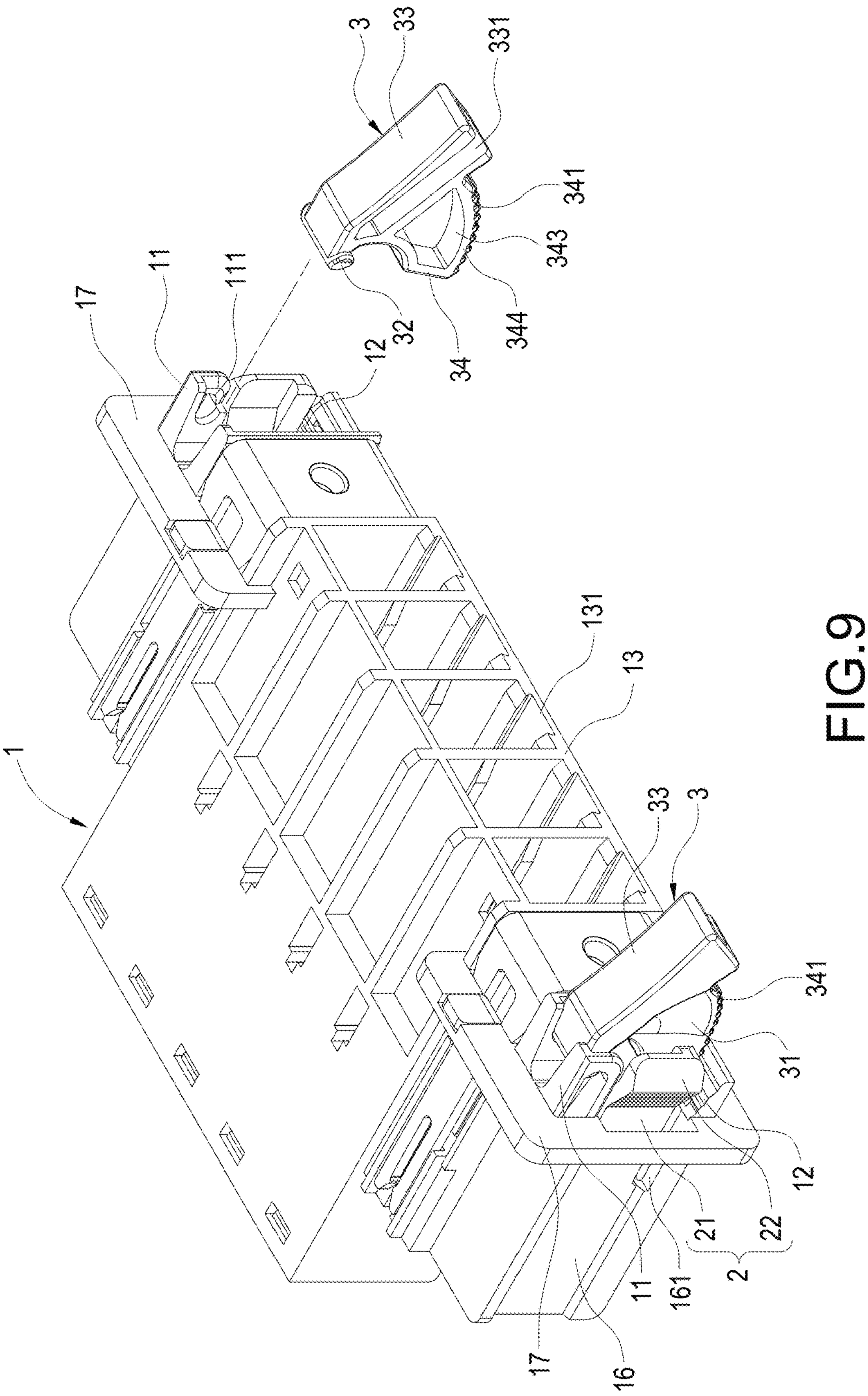
FIG. 9 is an exploded perspective view of the connector structure according to another embodiment of the present disclosure.

Please refer to FIG. 9, which shows the connector structure 10 according to another embodiment of the present disclosure. The embodiment of FIG. 9 is similar to the embodiment of FIGS. 1 to 8, and the difference between the two embodiments is that the flexible edge strips 344 have different structures.

In detail, in FIG. 9, in each of the fan-shaped blocks 34, a hollow opening 343 is defined in the outer surface and adjacent to the lower edge, so that the lower edge of each of the fan-shaped blocks 34 forms a flexible edge strip 344. As a result, when the operable lever 3 rotate toward the through hole 101. Each flexible edge strip 344 is slightly deformed under force by means of the hollow opening 343, so that the protruding teeth 341 are engaged with each toothed block 12 and rotate relative to each toothed block 12. In this way, the present embodiment may achieve the same functions and effects as those of the embodiment shown in FIG. 1 to FIG. 8.

In summary, the connector structure of the present disclosure for secure installation is not disclosed by similar products and in public use.

What is claimed is:

1. A connector structure, installed on a fixed plate (100), the fixed plate (100) comprising a through hole (101), the connector structure (10) comprising:

a connector housing (1), inserted through the through hole (101);

two elastic clamping arms (2), extended from the connector housing (1) and arranged on two sides of the connector housing (1) opposite to each other; and two operable levers (3), each of the two operable levers (3) pivotally connected to the connector housing (1) and sandwiched between the connector housing (1) and one of the two elastic clamping arms (2) correspondingly, comprising an inclined surface (31) such that each of the two operable levers (3) has a bulged portion with a thickness (h) gradually increased in a direction away from the through hole (101), and the inclined surface (31) disposed corresponding to the one of the two elastic clamping arms (2);

wherein the connector housing (1) comprises two U-shaped elastic arms (11), each of the two U-shaped elastic arms (11) is arranged between the connector housing (1) and one of the two elastic clamping arms (2) correspondingly and is exposed from the through hole (101), and the two operable levers (3) are pivotally connected to the two U-shaped elastic arms (11) respectively;

wherein when the two operable levers (3) are configured to rotate toward the through hole (101), the two elastic clamping arms (2) are pushed outward by two inclined surfaces (31) to be engaged with the fixed plate (100).

2. The connector structure according to claim 1, wherein each of the U-shaped elastic arms (11) comprises two pivot holes (111) opposite to each other and disposed inside, each of the operable levers (3) comprises a pivot shaft (32) disposed protrusively, and two ends of the pivot shaft (32) are pivotally connected to the two pivot holes (111) respectively.

3. The connector structure according to claim 2, wherein the two U-shaped elastic arms (11) are arranged above the two elastic clamping arms (2), the connector housing (1) comprises two toothed blocks (12), each of the two toothed blocks (12) is disposed between the connector housing (1) and one of the two elastic clamping arms (2) and arranged below the one of the two elastic clamping arms (2), each of the operable levers (3) comprises a push block (33) and a fan-shaped block (34) arranged below the push block (33), the inclined surface (31) is located on an outer surface of the fan-shaped block (34), and the fan-shaped block (34) comprises a plurality of protruding teeth (341) disposed on a lower edge thereof and engaged with one of the toothed blocks (12).

4. The connector structure according to claim 3, wherein a plurality of hollow holes (342) is defined on the outer surface of the fan-shaped block (34) and adjacent to the lower edge, and a flexible edge strip (344) is disposed on the lower edge of the fan-shaped block (34).

5. The connector structure according to claim 3, wherein a hollow opening (343) is defined on the outer surface of the fan-shaped block (34) and adjacent to the lower edge, and a flexible edge strip (344) is disposed on the lower edge of the fan-shaped block (34).

6. The connector structure according to claim 3, wherein the connector housing (1) comprises a front side (13) exposed from the through hole (101) and two recesses (132) defined on left side and right side from the front side (13).

7. The connector structure according to claim 6, wherein the connector housing (1) comprises two stop blocks (17) extended therefrom and surrounding the two recesses (132) respectively, and each stop block (17) is blocked by and positioned with the fixed plate (100).

8. The connector structure according to claim 7, wherein each of the U-shaped elastic arms (11) is extended from an upper portion of one of the stop blocks (17) in a direction away from one of the recesses (132), each of the toothed blocks (12) is extended from a lower portion of the one of the stop blocks (17) in a direction away from the one of the recesses (132), and each of the operable levers (3) is received in or released from the one of the recesses (132).

9. The connector structure according to claim 6, wherein the connector housing (1) comprises an outer side wall (16) disposed on an outer side of each of the recesses (132), the outer side wall (16) comprises two linear grooves (161) extended inward from an open end of one of the recesses (132), and each elastic clamping arm (2) comprises a linear elastic arm (21) located on the outer side wall (16) and arranged between the two linear grooves (161), and an engagement block (22) disposed protrusively on an outer side of the linear elastic arm (21).

10. The connector structure according to claim 3, wherein the push block (33) comprises a socket (331) disposed away from the pivot shaft (32).

11. The connector structure according to claim 6, wherein a plurality of insertion slots (131) is defined on the front side (13).

* * * * *